US006189288B1

(12) United States Patent
Bowers (10) Patent No.: US 6,189,288 B1
(45) Date of Patent: Feb. 20, 2001

(54) METHOD OF CONSTRUCTION OF ELEVATED ANNULAR PLATFORM (75) Inventor: John Murray Bowers, 54 Thames Street, Napier (NZ)

(73) Assignee: John Murray Bowers, Napier (NZ)

(*) Notice: Under 35 U.S.C. 154(b), the term of this patent shall be extended for 0 days.

(21) Appl. No.: 09/316,236

(22) Filed: May 21, 1999

(30) Foreign Application Priority Data

May 22, 1998 (NZ) ........................................ 330511
Jan. 29, 1999 (NZ) ........................................ 333982

(51) Int. Cl.[7] .................................................. E04B 1/00
(52) U.S. Cl. ............................................... 52/742.14
(58) Field of Search ..................... 52/742.14; 14/77.1, 14/77.3; 264/33–35

(56) References Cited

U.S. PATENT DOCUMENTS

| 3,804,930 | * | 4/1974 | Dashew | 264/33 |
| 4,231,977 | * | 11/1980 | Schreck | 264/33 |
| 4,717,517 | * | 1/1988 | Halberstadt | 264/33 |
| 4,768,938 | * | 9/1988 | Greeson | 264/33 |
| 4,778,144 | * | 10/1988 | Gregory | 264/33 |
| 4,921,649 | * | 5/1990 | Greeson | 264/33 |
| 5,072,474 | * | 12/1991 | Dilger | 14/77.1 |
| 5,261,137 | * | 11/1993 | Barkdull | 14/77.1 |
| 5,460,499 | * | 10/1995 | Franklin | 264/33 |
| 5,782,738 | * | 7/1998 | Bowers | 52/742.14 |

FOREIGN PATENT DOCUMENTS

48943/93    4/1994  (AU).
270955      4/1995  (NZ).

* cited by examiner

Primary Examiner—Beth A. Stephan
(74) Attorney, Agent, or Firm—Greer, Burns & Crain, Ltd.

(57) ABSTRACT

The invention disclosed is for a manner of construction of an elevated annular platform, generally elevated and which rotates. The platform includes a means of rotation between the annulus and the foundation. The platform is formed of reinforced concrete material, poured in one pour. The mould for the platform comprises a plurality of bail sections which, in number, correspond to the bails of the finished platform, and inner and outer edgings. Each bail section includes support sides, which are secured to the inner and outer edgings, and a base panel. The panels are made from a material which, when the annulus is formed, bonds to the concrete to form a unitary structure. The moulding thus forms an integral part of the completed platform, and is not removed after construction.

27 Claims, 11 Drawing Sheets

METHOD OF CONSTRUCTION OF ELEVATED ANNULAR PLATFORM

TECHNICAL FIELD

The present invention relates to a method of construction of an annular platform which is elevated and which can be partially constructed off site and partially constructed on site. Such platforms are ones which rotate, the main example being platforms for milking sheds. Preferably the construction is of an annular platform and is substantially of reinforced concrete.

BACKGROUND

Annular, elevated platforms which rotate are known. My Australian Pat. No. 674,637 discloses a method of construction of a platform which can be carried out on site. The method disclosed allows for part or all of the platform to be formed in one pour of concrete, with a means for providing a mould in an elevated position prior to the pouring.

However it has been found that there are some disadvantages to this method. Firstly, there can be undue stress placed on the concrete on one side of the centrally located beam (underneath the platform). This can occasionally lead to stress fractures or cracking of the concrete.

Also, with the manner of forming of the mould (preparatory to pouring the concrete to form the platform), nearly all of this must be done on site. Thus the equipment need for supporting the mould needs to be dismantled and transported from one site to the next. It is difficult to use this method of construction to prepare much of the form work off site. While it can be done, the method also means that the elements prepared off site, where possible, are often awkwardly shaped for shipment. Further, some duplication of otherwise re-usable elements is necessary.

Further, the moulding, if it remains under the platform, does not form an integral part of the platform and therefore does not add structural strength to the platform.

An object of the present invention is the provision of a method of construction of an elevated annular platform which overcomes the above described difficulties, and further provides a useful alternative to the presently available methods.

Further aspects and advantages of the present invention will become apparent from the ensuing description which is given by way of example only.

For the purposes of this specification, an 'elevated annular platform' is a platform which is up to two meters off the ground. It may be supported on one side with, for example, a base or support elements of the foundation underneath it. This support may be a support on the inner or outer side of the annulus, so that the outer or inner part of the platform is apparently cantilevered from the base or support elements of the foundation. The platform may be supported along under the center (that is, the center of the annulus of the platform) in addition to the above support, or instead of the above support. It may therefore be a free-standing platform with a circular support means under the platform. Such support may or may not rotate with part or all of the means of rotation of the platform, this means being secured to and/or located under the annulus.

Also for the purposes of this specification, the term 'center line' is used to refer to the (imaginary) circle which falls at the center of the annulus of the platform, equidistant from the inner and outer edges of the annulus.

DISCLOSURE OF INVENTION

The present invention provides a method of construction of an annular platform, said platform having an inner and an outer edge and including a number of bail sections, the number being equal to the number of bails on the platform, and the dimensions of each bail section being determined from the width of the platform, the number of bails and the length of the center line; said method including the steps of:

constructing an adequate foundation to take and support the weight of the platform and the dead and live loads to be applied thereon (when completed);

erecting a curved, flanged metal support beam which is positioned along the centre line of the intended position of the platform and elevated to the predetermined height to ensure the required elevation of the platform, the top of said beam having an inward and an outward flange or flanged edge;

preparing the bail sections, each bail section having an inner and an outer edge, and two radial sides, each bail section including:

a side support means which is positioned along one radial side of the bail section and which is secured to the metal support beam; said means being positioned such that the side support means of one bail section is engageable with an immediately adjacent bail section;

a panel of pre-cast material, which includes an inner edge of the same radius as that of the inner edge of the platform, an outer edge that is the same radius as the outer edge of the platform, and two straight sides that are the same length as the length of the side support means; the panel being positioned over the said support beam, and between the inner and outer edges of the platform and between the side support means of the bail section and the support means of the adjacent bail section;

locating an upright edging around each of the inner and outer edges of said platform, and securing each said edging to the respective ends of the side support means, thereby providing a mould into which the material of the platform can be poured;

positioning and securing within the mould the required reinforcing material;

positioning and securing within the mould the required blanks, sleeves and packing for cut-outs and channels to be formed in the finished platform; and filling the mould with filler material and allowing it to set and/or cure; wherein said filler material and said pre-cast material bond together to form a single structural layer.

Optionally, each panel may include an inner and an outer panel. The inner panel has a inner edge of the same radius as that of the inner edge of the platform and an outer edge dimensioned to rest on the flanged top of the said support beam, and two straight sides that are half the length of the side support. The inner panel is positioned on the two side supports and the said support beam, and between the inner edge of the platform and the said support beam. The outer panel has an inner edge dimensioned to rest on the flanged top of the said support beam, an outer edge that is the same radius as the outer edge of the platform, and two straight sides that are half the length of the side support. The outer panel is secured between the two side supports and the said support beam, and is positioned between the inner edge of the platform and the said support beam.

Preferably, each panel is of concrete or concrete fiber or other rigid fibrous material, or a combination thereof. Preferably, the upright edgings are left in place to form the edges of the platform, but may be removed.

Preferably the filler material is concrete. Other appropriate materials may also be used, selected from the group consisting of: natural rubber, synthetic rubber, plastics materials; or a compound comprising a combination of these materials. One major selection criterion is that the filler material and the panel material (pre-cast material) bond together irreversibly.

Preferably each side support means includes two lengths of angle iron, one on each side of the straight side of the bail section. Each length is same as the dimension of the radial side of a bail section. The angle iron is secured to the support beam, by known means (for example, bolting or welding).

In another option, one part of each of the side support means of adjacent bail sections are combined, the two adjacent lengths of angle iron being secured together with an upright plate welded therebetween and along the length of the bail section.

Preferably also a spacer forms part of the support beam and positioned on top thereof. The spacer extends around the length of the center line and, in cross-section, is a solid rectangle.

In a yet further embodiment of the side support means, each side support means includes:
  a section of flat bar which, in length, is less than or equal to the width of the platform, each bar being positioned on one radial side of the bail section;
  a shear connector plate which is positioned in a vertical orientation along the one radial side of the bail section and connected to the respective bar;
  a panel support bar which is positioned along the one radial side below the shear connector plate and, in cross-section, extending either side of the shear connector plate.

Preferably the shear connector plates, panel support bars and flat bars are constructed from iron or steel.

The flanged metal support beam may be a beam on its own or it may form part of another assembly. For example, it may be part of an I-beam forming a top support of a means of rotating a milking platform. Such means may be of the type disclosed in my Australian Pat. No. 671,483.

The present invention further provides an annular elevated platform which comprises:
  an annulus of material which has an inner and an outer edge;
  an adequate foundation to take and support the weight of the platform and the dead and live loads to be applied thereon (when completed);
  a curved, flanged metal support beam located along the center line of the intended position of the platform and elevated to the predetermined height to ensure the required elevation of the platform, the top of said beam having an inward and an outward flange or flanged edge;
  a plurality of bail sections, the number being equal to the number of bails, and the dimensions of each section being determined from the width of the platform, the number of bails and the length of the center line; wherein
  each bail section has an inner and an outer edge, and two radial sides, each bail section including:
    a side support means which is positioned along one radial side and which is secured at the midpoint to the support beam
    at least one panel of pre-cast material, each said panel having an inner edge of the same radius as that of the inner edge of the platform, an outer edge that is the same radius as the outer edge of the platform, and two straight sides that are the same length as the length of the side supports; each panel being positioned and supported between the two side support means and the said support beam, and between the inner and outer edges of the platform;
    an upright edging around each of the inner and outer edges of said annulus, and secured to the ends of the side supports;
  material which fills the mould made by the inner and outer edgings, the side supports and the inner and outer panels; wherein said filler material and said pre-cast material bond together to form a single structure as the said annulus of material.

Optionally each panel for each bail section includes an inner and an outer panel. The inner panel has a inner edge of the same radius as that of the inner edge of the platform and an outer edge dimensioned to rest on the flanged top of the said support beam, and two straight sides that are half the length of the side support. The inner panel is positioned on the two side support means and the said support beam, and between the inner edge of the platform and the said support beam. The outer panel has an inner edge dimensioned to rest on the flanged top of the said support beam, an outer edge that is the same radius as the outer edge of the platform, and two straight sides that are half the length of the side support. The outer panel is secured between the two side support means and the said support beam, and is positioned between the inner edge of the platform and the said support beam.

Optionally, the side support means may be one of the preferred embodiments described above.

The present invention further provides a kit set of parts for use in the construction of an elevated annular platform, said kit including: a plurality of the elements for construction of a plurality of bail sections to form a mould for said platform, said elements including the following:
  a plurality of side support means each of which is to be positioned along a radial side of a bail section and secured at the midpoint to the flanged support beam;
  a panel of pre-cast material, each said panel having an inner edge of the same radius as that of the inner edge of the platform, an outer edge that is the same radius as the outer edge of the platform, and two straight sides that are the same length as the length of the side support means; each panel being positioned between the two side supports and the said support beam, and between the inner and outer edges of the platform;
  wherein said elements are crated or packed to maximize the use of available space in a crate or container for shipping to the site of the construction of the platform.

The side support means may be selected from any of the above described embodiments of the side support means.

BRIEF DESCRIPTION OF DRAWINGS

By way of example only, preferred embodiments of the present invention is described in detail with reference to the accompanying drawings, in which.

BEST MODES FOR CARRYING OUT THE INVENTION

Figure 1:
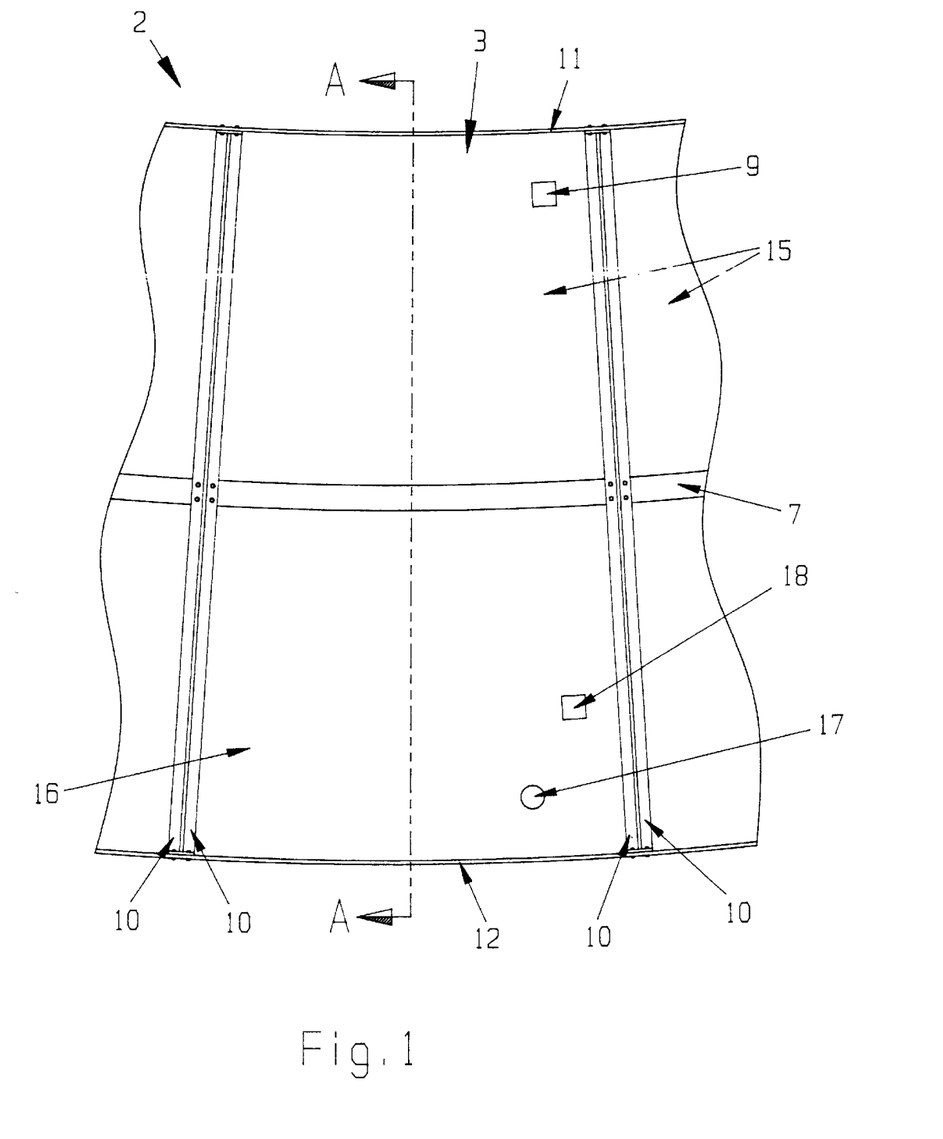
FIG. 1 is a partial plan view of a first preferred embodiment of a bail section of the platform of the present invention, without the concrete filling.

Referring to the FIGS. 1 to 5 of the drawings, a platform 2 is thereshown in part. The platform 2 comprises a plurality of bail sections 3. The number of bail sections 3 is the same as the number of bails of the finished platform 2. A top I-beam 4 forms part of the means of rotation 5 of the platform, as shown in Australian Pat. No. 671,483. The top I-beam 4 includes a top flanged portion 6 with an upper flat surface 7 (FIG. 1). The rotating means 5 is supported by a base 8 (FIG. 2) of concrete or reinforced concrete, in known manner. Alternatively the base 8 may be formed of a plurality of evenly spaced apart poles or beams rigidly secured to part of the means of rotation 5. The base 8 is positioned on and secured to or on the ground or other surface 29 (for example, a concrete base). The top I-beam 4 is positioned under the center line of the platform 2. The center line is substantially within the dimensions of the upper flat surface 7 of the top I-beam 4. The beam 4 is formed along substantially all the center line.

Figure 2:
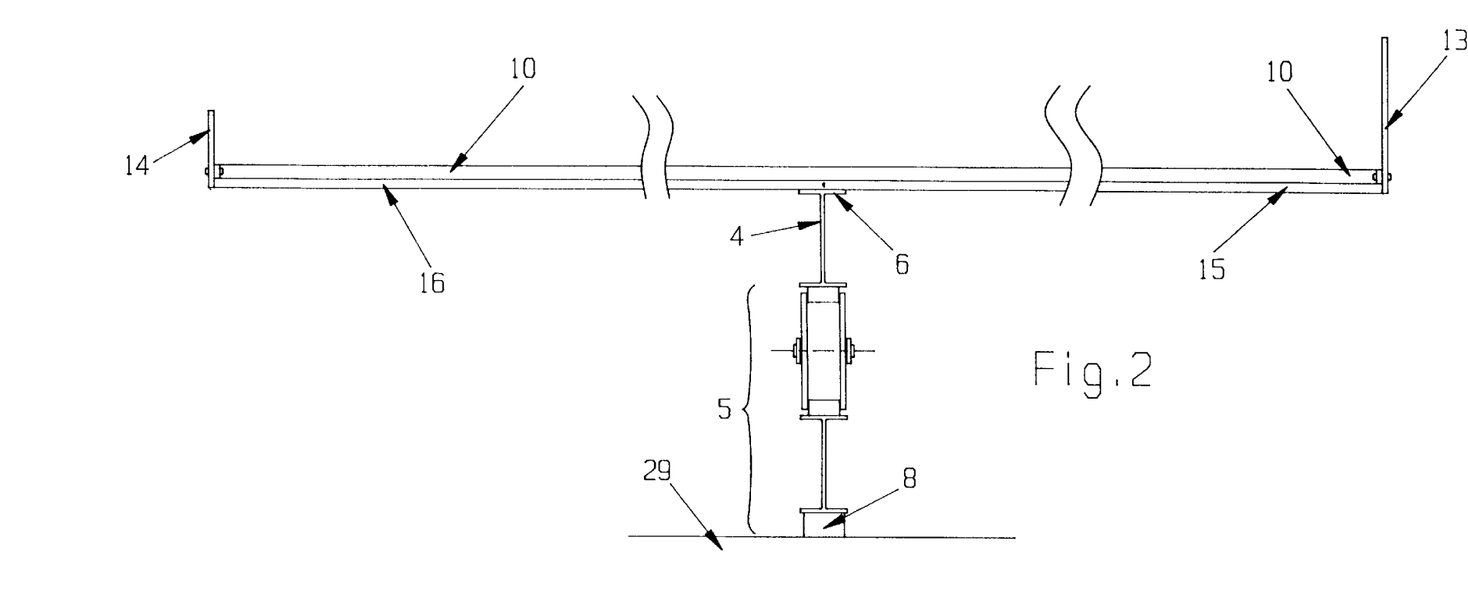
FIG. 2 is a cross-section along the line AA of FIG. 1.
Figure 3:
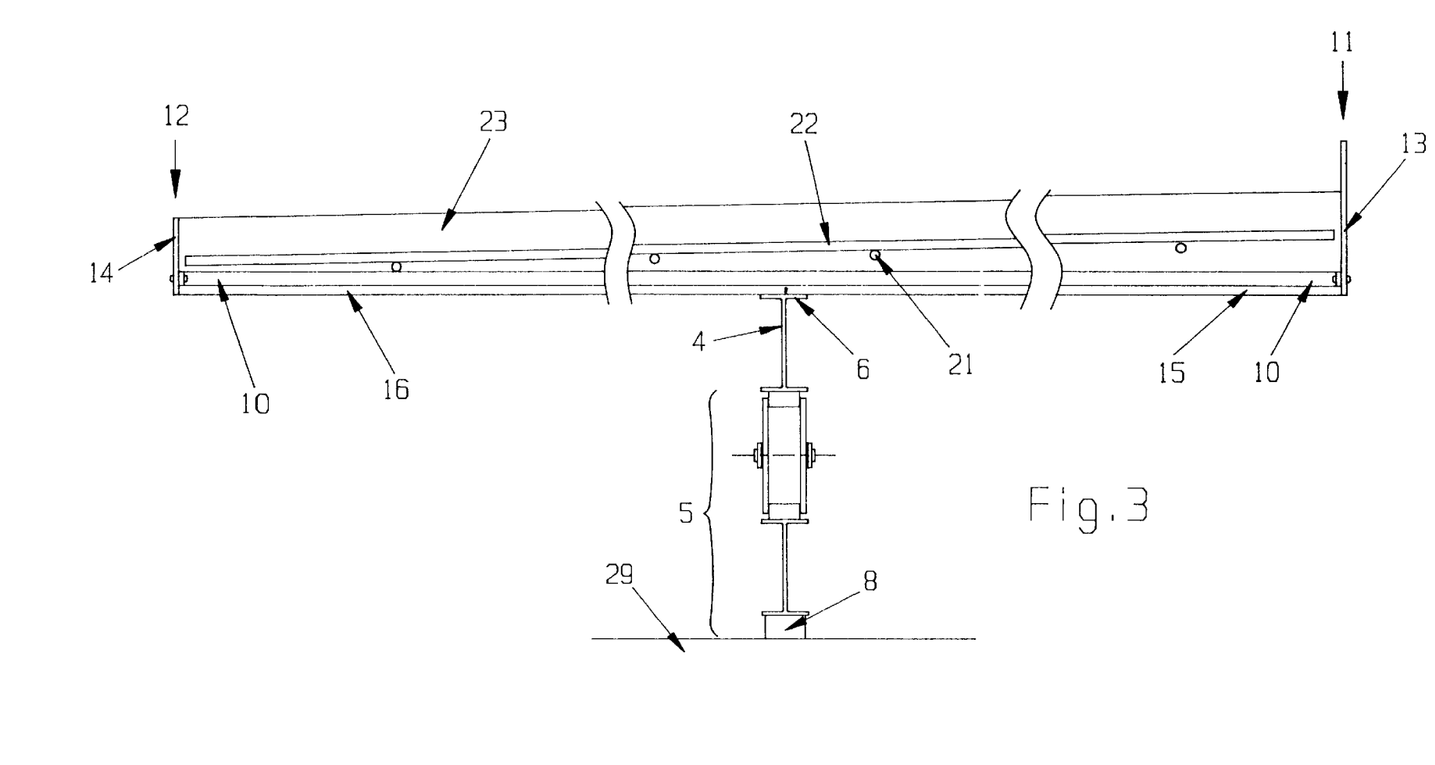
FIG. 3 is the same cross-section as shown in FIG. 2 after completion of the construction before filler is added to the mould.

In a first preferred embodiment of the mould, each bail section 3 includes two side supports 10 which are radially positioned, one on each side of the bail section 3. Thus each side support 10 is used for each of two adjacent bail sections 3. Each side support 10 is secured at or about its center to the upper flat surface 7 by known means, for example bolting or welding.

A curved metal upright inner edging 13 and outer edging 14 (respectively) is positioned (FIGS. 2 and 3) along the inner edge 11 and at the outer edge 12 (FIG. 1). The upright edgings 13 and 14 are located along all or substantially all of the inner and outer circumferences of the platform 2. The ends of each of the edgings 13 and 14 are secured to the ends of the side supports 10. The method of securement can be by any known means, for example bolting, welding (etc).

Each bail section 3 includes an inner and an outer panel (15 and 16, respectively). The inner panel 15 is dimensioned to fit within the area bounded by the upper flat surface 7, inner edge 11, and the side support 10 of each bail section 3. The outer panel 16 is dimensioned to fit within the area bounded by the upper flat surface 7, outer edge 12, and the side support 10 of each bail section 3.

Blanks and cut-outs (9, 17, 18; FIG. 1) are positioned within each bail section 3, for removal after the pouring of the concrete 23. The spaces left can then be used, for example, to secure bail dividers and milking equipment on and to the platform 2. Sleeves (not shown) can be left in place of the blanks or the cut-outs, which sleeve can remain in the concrete when poured, if so desired.

Each inner panel 15 and outer panel 16 is formed of a pre-cast material. Each inner panel 15 and outer panel 16 is of a thickness that is slight compared to the finished thickness of the platform 2. The pre-cast material is optionally concrete. However other materials may also be used. For example the material may be fibre-glass, or a rigid plastics material. One criterion for selection is that the material bonds to concrete or the filler material used for the platform 2. Alternatively, if so desired, non concrete, non-metallic materials may be used for the pre-cast elements as well as for the filler.

Figure 4:
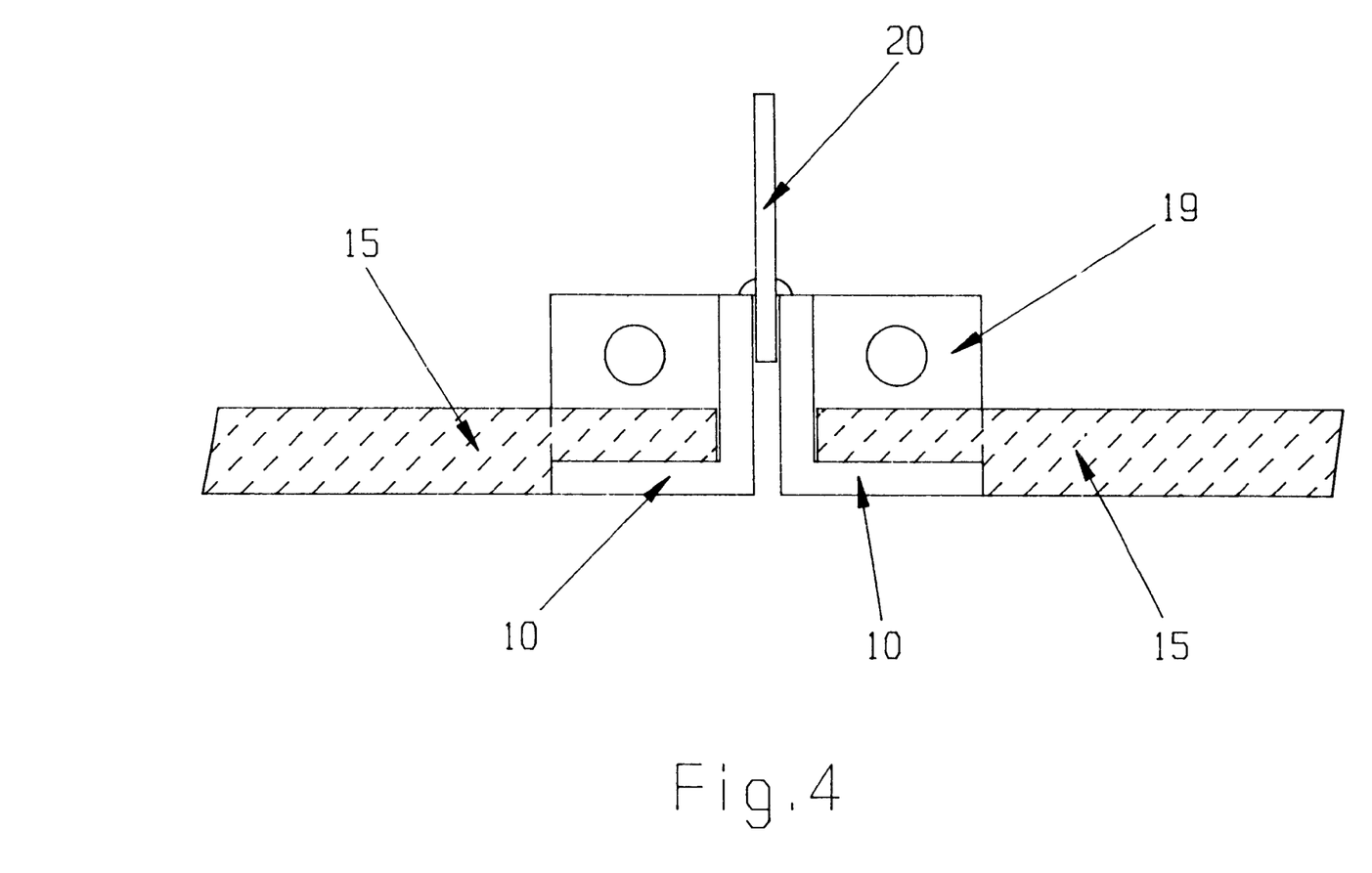
FIG. 4 is a side elevation of the end of a second preferred embodiment of the mould showing the join between two bail sections of the present invention, part way through the method of construction.
Figure 5:
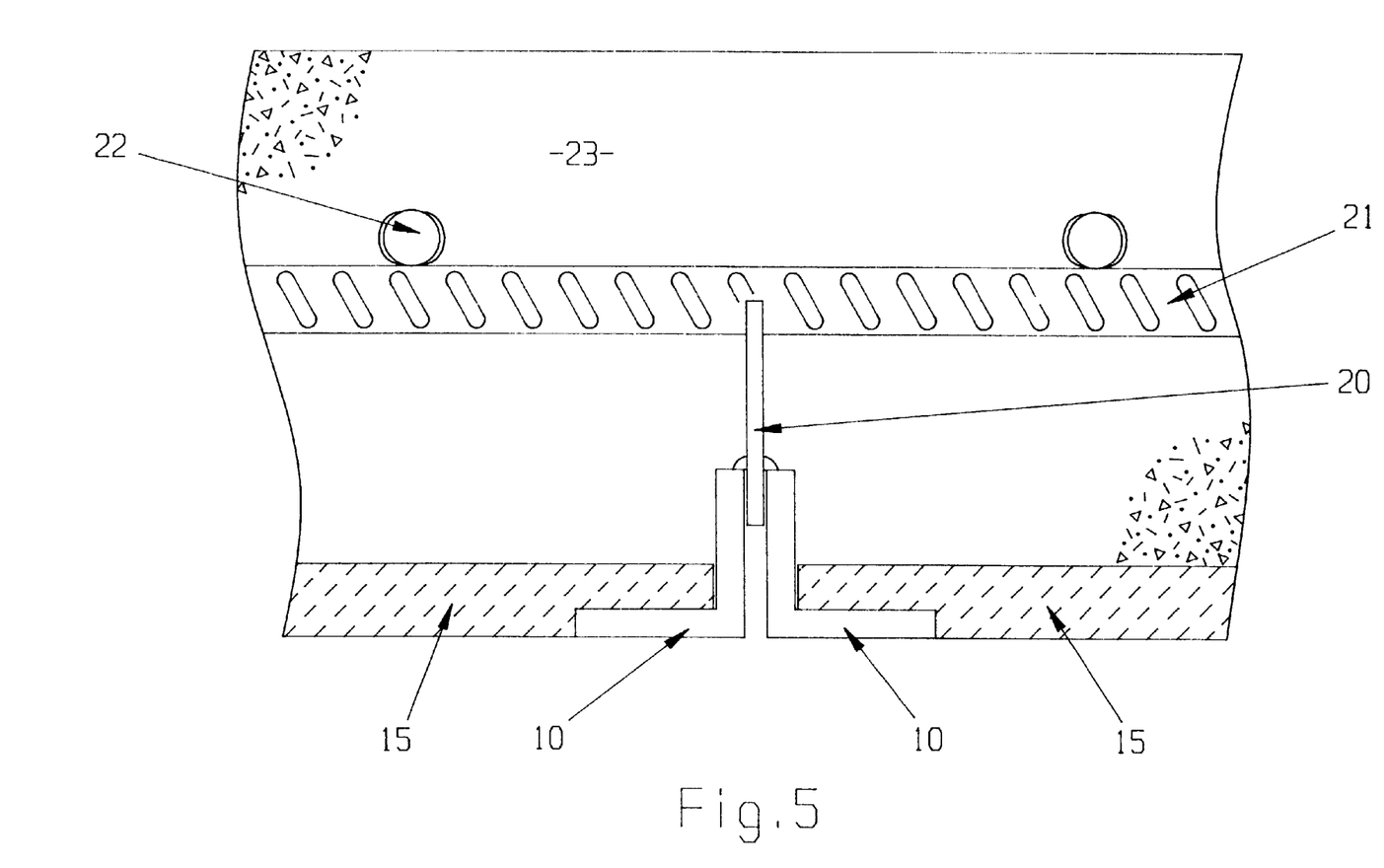
FIG. 5 is the same view as in FIG. 4, at the end of the method of construction.

As shown in FIGS. 4 and 5, the edges of the inner panel 15 and outer panel 16 may have a stepped shoulder, so that when the inner panel 15 and outer panel 16 are in position, the underside of the inner panel 15 and outer panel 16 are flush with the underside of the adjacent side support 10. The thickness of each inner panel 15 and outer panel 16 is sufficient to support the weight of the material poured to form the platform 2. The inner panel 15 and outer panel 16 need not be sufficiently strong to support the live weight on the finished platform 2 as this is achievable by the material 23 and reinforcing rods (21, 22), when cured.

A metal strip 20 is rigidly secured between adjacent side supports 10, with a lower portion of the metal strip 20 between the two side supports 10. The upper portion of the metal strip 20 stands above the side supports 10.

A second preferred embodiment of the mould is shown in FIGS. 4 and 5, in which the detail of the side support 10 from adjacent sections bail sections 3 can be seen. In this embodiment each side support 10 is adjacent to, but not touching the side support 10 from the adjacent bail section 3. If so desired, an end plate 19 is secured to the ends of the side supports 10. This ensures that securing the inner or outer edging (13 or 14) to the respective inner and outer ends of the side support 10 is easy to accomplish. Other parts of the second preferred embodiment of the bail section 3 not described above or below, are as described for the first preferred embodiment.

In both first and second preferred embodiments, reinforcing, for example steel reinforcing rods (21, 22, FIGS. 3 and 5), is then shaped and secured within the mould of the platform 2. Some rods 22 are laid in an approximately radial pattern, across the width of the platform 2. A plurality of rods 21 are laid around the platform 2. The underside of the rods 21 are nicked so that the rods 21 can be located on each metal strip 20 across which they are positioned.

Referring to FIG. 3, the reinforcing rods 21 and 22 are thereshown, without the material 23 of the platform 2 present. If so desired, and as shown in FIG. 3, the platform 2 may slope from the inner edge 11 to the outer edge 12. The placement of the reinforcing rods 21 and 22 can be adjusted accordingly, along with the portion of the metal strip 20 standing above the two side support 10. Thus the reinforcing structure is centrally located in the depth of the concrete 23 of the platform 2.

The above described elements of both embodiments are used in the method of construction of the present invention in the following manner (using concrete as the material 23): the base 8, means of rotation 5, top I-beam 4 (from Australian Pat. No. 671,483), are positioned as desired for the appropriate radius of platform 2 and at the appropriate position for the desired elevation of the platform 2. The side supports 10 are secured, at or about the center, to the upper flat surface 7. If the metal strip 20 is present, a metal strip 20 is welded or otherwise secured between each set of adjacent side supports 10 from adjacent bail sections 3. The inner and outer edgings (13, 14) are bolted or otherwise secured to the inner and outer ends (respectively) of the side support 10. If the end plates 19 are used, these are secured by bolting to the side supports 10 before the edgings 13, 14 are secured to the side supports 10. The blanks and cut-outs 9, 17, 18 are secured in known manner in the pre-determined positions.

These elements (of the first and second embodiment) form a free-standing mould for the annulus of the platform 2. The reinforcing rods 21 and 22 are inserted in known fashion. The concrete 23 forming the platform 2 is poured into the mould and allowed to set and cure. The concrete 23 is poured so that the mould is filled to the top of the outer upright edging 14. A slope, as described above, may be used on the top surface of the concrete 23.

The blanks and cut-outs 9, 17, 18 are later removed, leaving spaces (or sleeves, if used within the spaces) ready for installation of further equipment.

Figure 6:
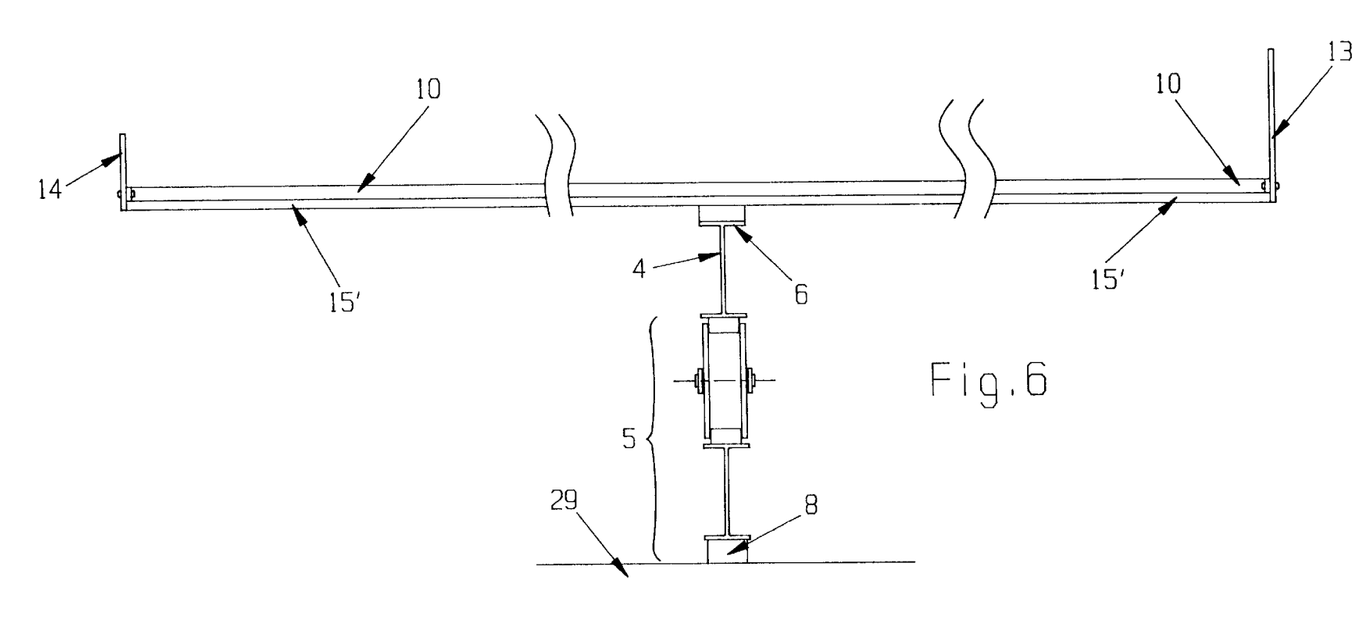
FIG. 6 is a cross section along the line AA from FIG. 1 showing a second preferred embodiment of the panels of the present invention.

Referring to FIG. 6, a second preferred embodiment of the panels (15') of the platform 2 can also be used. This panel 15' comprises the elements of the inner and outer panels (15, 16). Thus the panel 15' combines these two panels as one panel. The panel 15' rests across the upper flat surface 7 for each of the bail sections 3. Otherwise the panel 15' is installed as described above. This embodiment of the panel (15') may be used with either of the above embodiments of the side supports.

The above described platform 2 has been described as being poured in one piece.

However, it will be appreciated that only part of the annular mould need be filled with the concrete 23. Thus the annulus could be formed in two or more pieces.

Also, the above described platform 2 has been described with reference to the means of rotating the platform 2 as described in Australian Pat. No. 671,483. However, it will be appreciated that the platform 2 may be used with any other means of rotation, with appropriate adjustments to the placement of the top portion 6 of the beam. Similarly it will be appreciated that the platform 2 need not be one that is capable of rotation, and which may be supported, in whole or in part, by other additional supports around the outer portion of the annulus or the inner portion of the annulus.

As can be seen from the manner of assembly of the bail section 3, each section 3 can be separated into its component parts for transportation. All the side supports 10 can be bundled together. The inner and outer panels 15 and 16 (or panels 15') can be stacked and the edgings 13, 14 and beam 4 shipped in parts; thus making efficient use of space in a container, truck, or other storage vessel. Also if so desired, any parts of iron or steel can be galvanized or otherwise sealed before use.

Referring to the FIGS. 7 to 11 of the drawings, a third embodiment of a platform 102 is thereshown in part. Like reference numbers refer to the same part as previously described in the first preferred embodiment of the platform 2. Similarly the embodiment of the panels 15' may be used with this embodiment of the platform 102.

Figure 9:
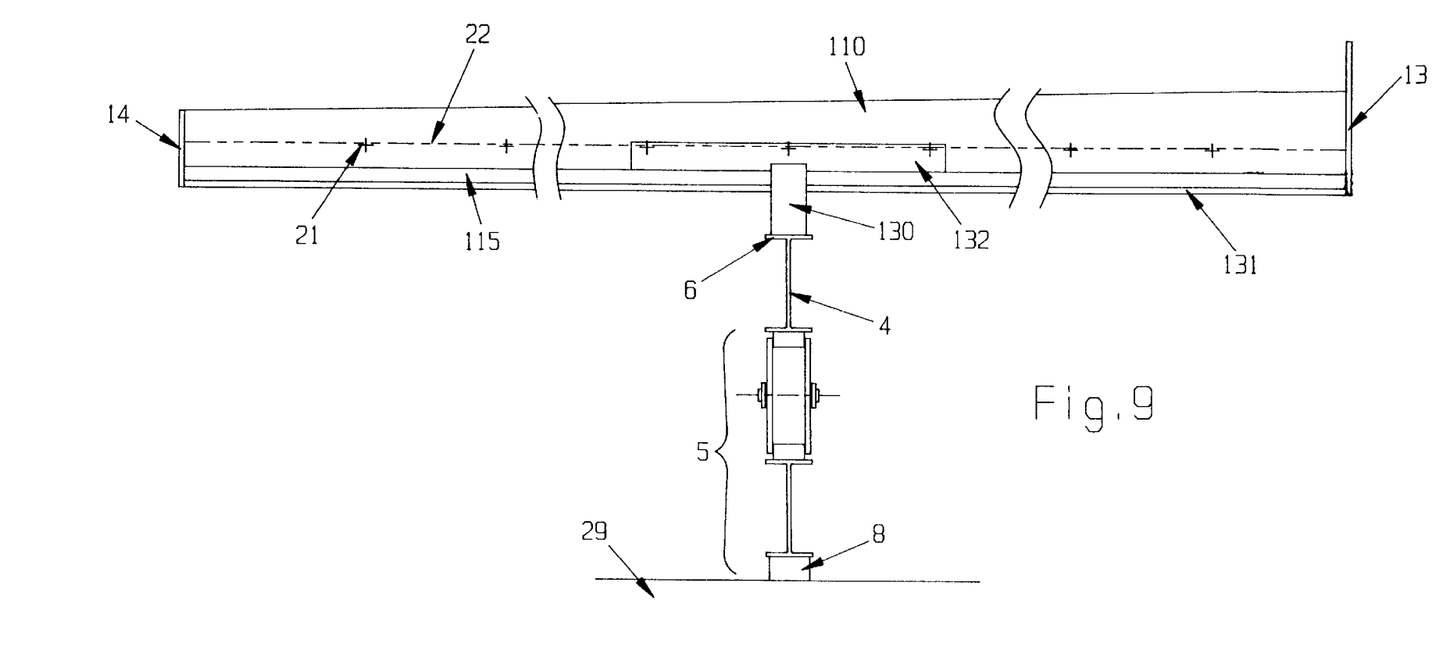
FIG. 9 is the same cross-section as shown in FIG. 8 before the filler is added.
Figure 10:
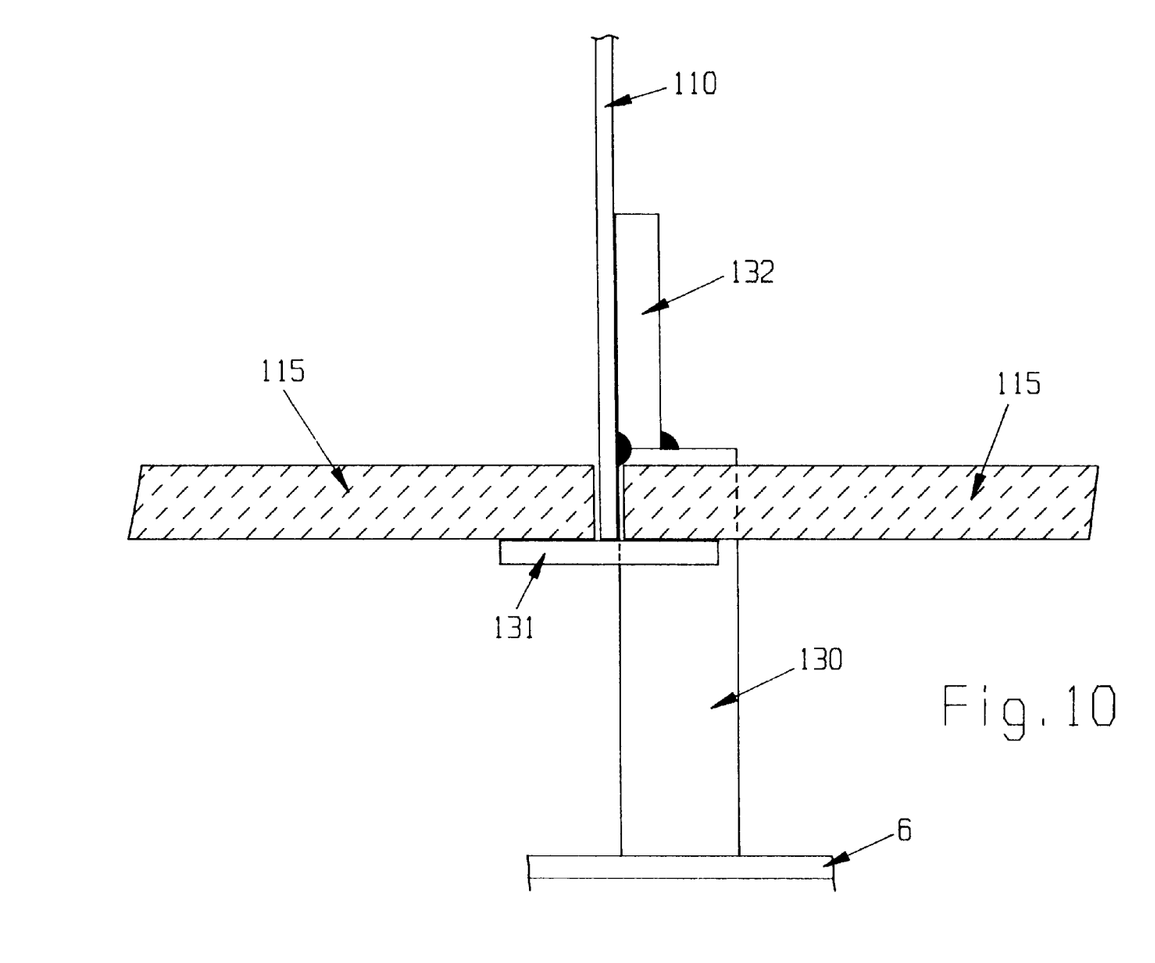
FIG. 10 is a side elevation of the end of the join between two bail sections of the third preferred embodiment of the present invention, part way through the method of construction.
Figure 11:
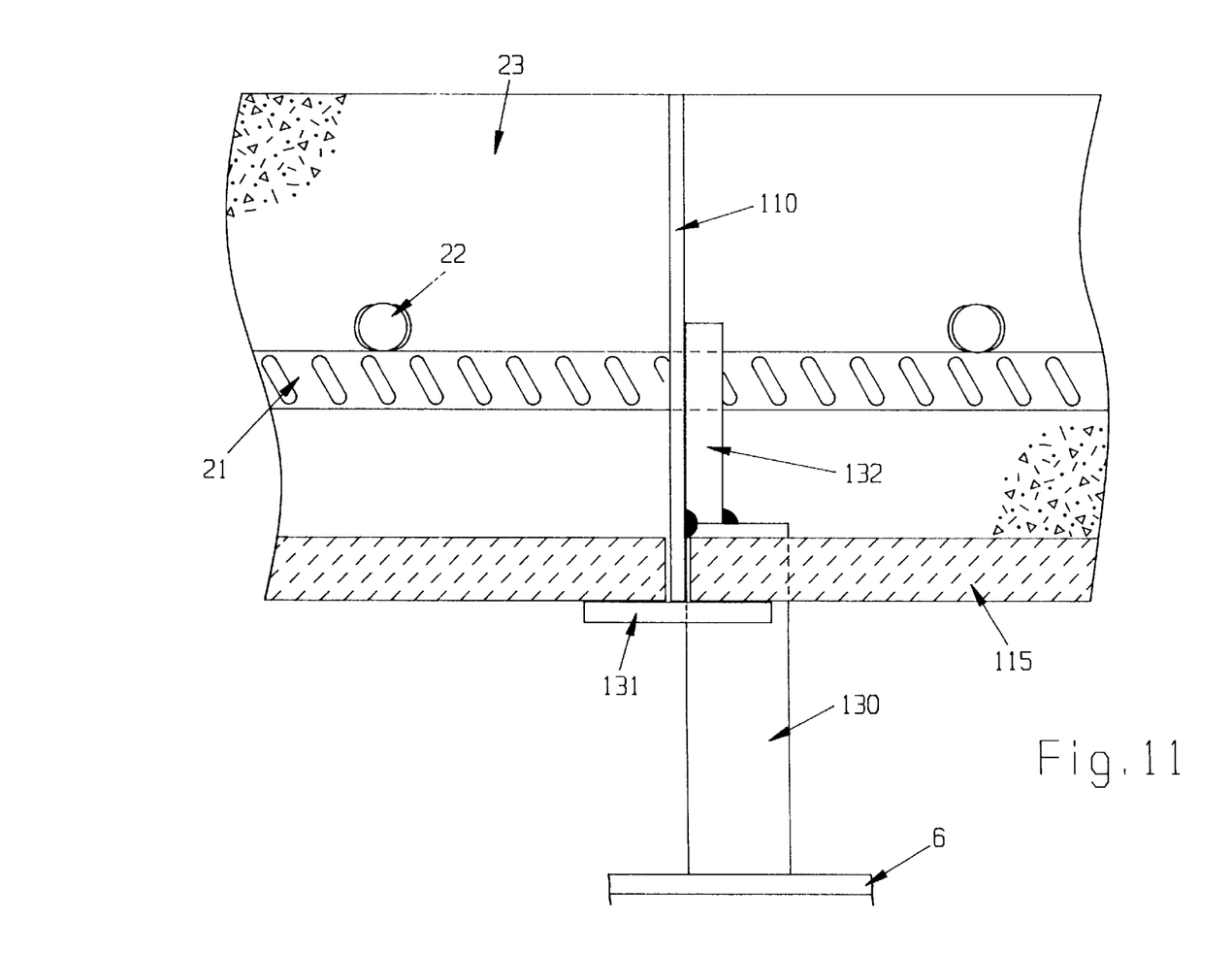
FIG. 11 is the same view as in FIG. 10, at the end of the method of construction.

Referring to FIGS. 9 to 11, an upright spacer 130 is placed on the upper flat portion 7 of the I-beam 4. In cross-section the spacer 130 is a solid rectangle. An upright bar 132 is centrally secured to top of the upright spacer at the edge of each bail section 3 by known means such as welding. A shear connector plate 110 is attached centrally to the bar 132 by known means, such as welding.

Figure 7:
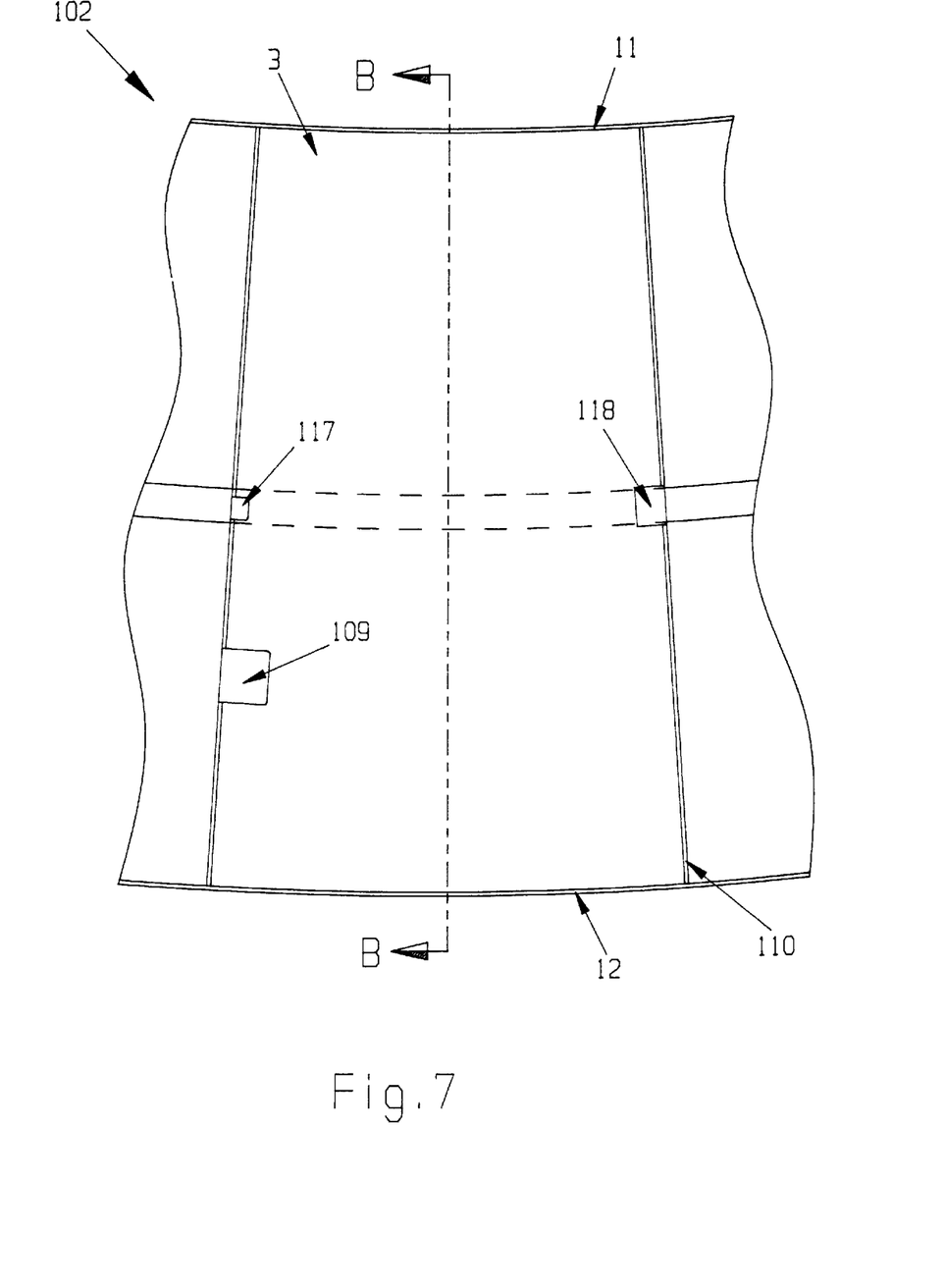
FIG. 7 is a partial plan view of a bail section of the platform of the second embodiment of the present invention, without the concrete filling.

A curved metal upright inner edging 13 and outer edging 14 is positioned (FIGS. 8 and 9) respectively at the inner edge 11 and at the outer edge 12 (FIG. 7). The upright edgings 13 and 14 are located along all or substantially all of the inner and outer circumferences of the platform 102. The ends of the shear connector plates 110 are secured to each of the edgings 13 and 14. The method of securement can be by any known means, for example bolting, welding (etc).

Figure 8:
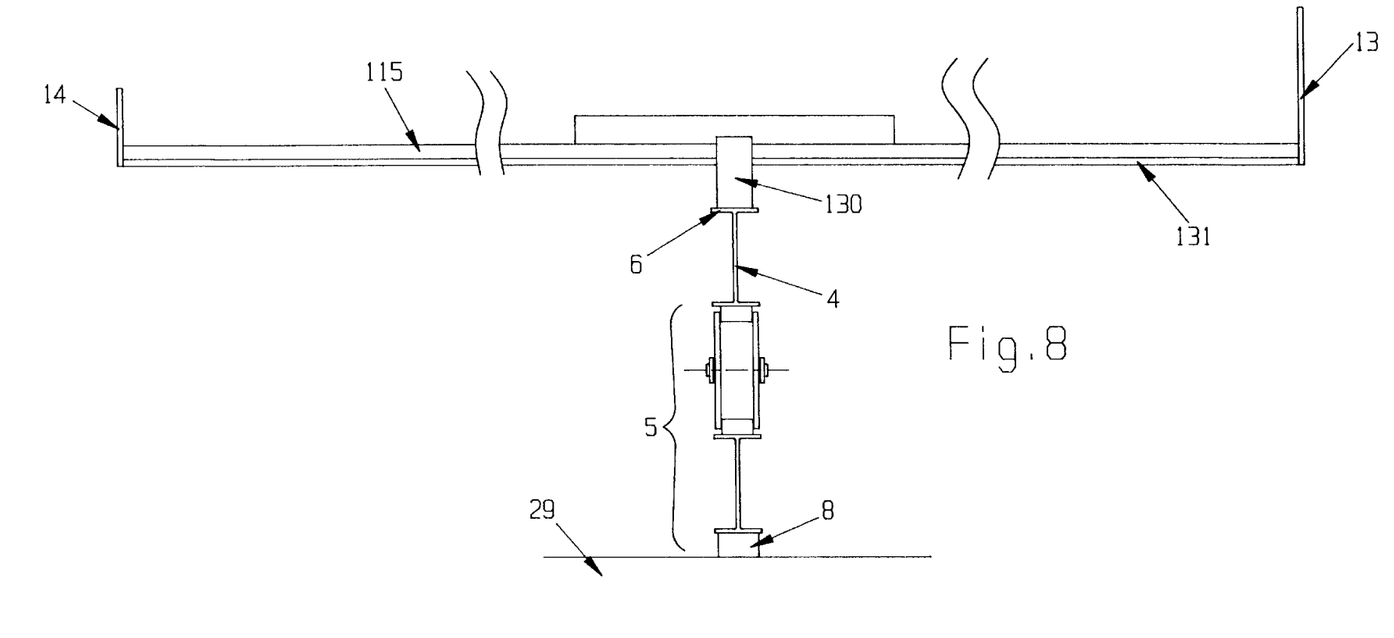
FIG. 8 is a cross-section along the line BB of FIG. 7.

Panel support bars 131 are positioned radially directly under the shear connector plates 110 and are connected by known means, such as welding, to the inner and outer edgings (13 and 14 respectively) and to the upright spacer 130.

Each bail section 3 includes a panel 115. The panel 115 is dimensioned to fit within the area bounded by the inner edge 11, outer edge 12, and the connector plates 110 of each bail section 3. The panel 115 rests on the panel support bars 131.

Blanks and cut-outs (109, 117, 118; FIG., 7) are positioned along the straight sides of each bail section 3, for removal after the pouring of the concrete 23. Corresponding spaces positioned along the straight sides edges of the panels (15, 15', 16, 115) of the platform (2, 102) are formed prior to the insertion of the panels (15, 15', 16, 115) to form a bail section 3 for the mould.

The spaces left can then be used, for example, to secure bail dividers and milking equipment (not shown) on and to the platform 102. Sleeves (not shown) can be left in place of the blanks or the cut-outs, which sleeve can remain in the concrete when poured, if so desired. The advantage of placing the blanks at the edges of each bail section 3 is that it is easier to cut out sections of the pre-cast panel 115 at the edges than further inward from the edges, as is required in the first embodiment.

As can be seen in FIG. 10 the edges of the panel 115 can remain square instead of being undercut, as in the first preferred embodiment. A person skilled in the art will appreciate that this arrangement of the blanks cut-outs (109, 117, 118; FIG. 7) may also be used for the panels (15, 16) in the first and second embodiments of the mould of the platform 2. The panels 115 may be constructed in the same manner and of the same material as the panels 15, 16.

The above described elements are used in the method of construction of the third preferred embodiment of the present invention in the following manner (using concrete as the material 23): an upright spacer 130 is positioned on the flanged top 6 of the I-beam 4. The spacer 130 is approximately rectangular in cross-section. Other shapes may be used if so desired. A bar 132 is attached by known means to the spacer. The shear connector plates 110 are rigidly attached to the bar 132. The inner and outer edgings (13, 14) are bolted or otherwise secured to the inner and outer ends (respectively) of the shear connector plates 110. The plate support bars 131 are connected to the inner and outer edgings (13, 14) and the upright spacer 130 by known means. The panel 115 rests on the support bars 131. The blanks and cut-outs 109, 117, 118 are secured in known manner in the pre-determined positions.

These elements form a free-standing mould for the annulus of the platform 102. The mould is filled as described above for the first and second preferred embodiments.

The blanks and cut-outs 109, 117, 118 are later removed, leaving spaces ready for installation of further equipment. Other options are as described above for the first and second preferred embodiments.

The kit of parts is assembled as described above for the previous embodiments of the platform 102.

Aspects of the present invention have been described by way of example only and it should be appreciated that modifications and additions may be made thereto without departing from the scope thereof.

What I claim is:

1. A method of construction of an elevated annular platform, said platform having an inner and an outer edge and including a number of bail sections, the number being equal to the number of bails on the platform, and the dimensions of each bail section being determined from the width of the platform, the number of bails and the length of the center line; said method including the steps of:

constructing an adequate foundation to take and support the weight of the platform and the dead and live loads to be applied thereon (when completed);

erecting a curved, flanged metal support beam which is positioned along the center line of the intended position of the platform and elevated to the pre-determined height to ensure the required elevation of the platform, the top of said beam having an inward and an outward flange or flanged edge;

preparing the bail sections, each bail section having an inner and an outer edge, and two radial sides, each bail section including:

a side support means which is positioned along one radial side of the bail section and which is secured to the metal support beam; said means being positioned such that the side support means of one bail section is engageable with an immediately adjacent bail section;

a panel of pre-cast material, which includes an inner edge of the same radius as that of the inner edge of the platform, an outer edge that is the same radius as the outer edge of the platform, and two straight sides that are the same length as the length of the side support means; the panel being positioned over the said support beam, and between the inner and outer edges of the platform and between the side support means of the bail section and the support means of the adjacent bail section;

locating an upright edging around each of the inner and outer edges of said platform, and securing each said edging to the respective ends of the side support means, thereby providing a mould into which the material of the platform can be poured;

positioning and securing within the mould the required reinforcing material;

positioning and securing within the mould the required blanks, sleeves and packing for cut-outs and channels to be formed in the finished platform; and filling the mould with filler material and allowing it to set and/or cure; wherein said filler material and said pre-cast material bond together to form a single structural layer.

2. A method of construction of an elevated annular platform as claimed in claim 1 wherein each side support means includes two lengths of angle iron, one on each side of the straight side of the respective bail section, the dimension of each length being the same as the dimension of the radial side of a bail section.

3. A method of construction of an elevated annular platform as claimed in claim 1 wherein one part of each of the side support means of adjacent bail sections are combined, the two adjacent lengths of angle iron being secured together with an upright plate welded therebetween and along the length of the bail section.

4. A method of construction of an elevated annular platform as claimed in claim 1 wherein a spacer forms part of the support beam and is positioned on top thereof, the spacer extending around the length of the center line and being, in cross-section, a solid rectangle.

5. A method of construction of an elevated annular platform as claimed in claim 1 wherein an end plate is secured to each of the ends of the side support means, and which end plate is secured to the respective inner or outer edging.

6. A method of construction of an elevated annular platform as claimed in claim 2 wherein an end plate is secured to each of the ends of the side support means, and which end plate is secured to the respective inner or outer edging.

7. A method of construction of an elevated annular platform as claimed in claim 1 wherein each side support means includes:

a section of flat bar which, in length, is less than or equal to the width of the platform, each bar being positioned on one radial side of the bail section;

a shear connector plate which is positioned in a vertical orientation along the one radial side of the bail section and connected to the respective bar;

a panel support bar which is positioned along the one radial side below the shear connector plate and, in cross-section, extending either side of the shear connector plate.

8. A method of construction of an elevated annular platform as claimed in claim 7 wherein the shear connector plates, panel support bars and flat bars are constructed from iron or steel.

9. A method of construction of an elevated annular platform as claimed in claim 1 wherein each panel comprises an inner and an outer panel, the inner panel having a inner edge of the same radius as that of the inner edge of the platform and an outer edge dimensioned to rest on the flanged top of the said support beam, and two straight sides that are half the length of the side support; the inner panel being positioned on the two side supports and the said support beam, and between the inner edge of the platform and the said support beam; the outer panel having an inner edge dimensioned to rest on the flanged top of the said support beam, an outer edge that is of the same radius as the outer edge of the platform, and two straight sides that are half the length of the side support and the outer panel being secured between the two side supports and the said support beam, and positioned between the inner edge of the platform and the said support beam.

10. A method of construction of an elevated annular platform as claimed in claim 7 wherein each panel comprises an inner and an outer panel, the inner panel having a inner edge of the same radius as that of the inner edge of the platform and an outer edge dimensioned to rest on the flanged top of the said support beam, and two straight sides that are half the length of the side support; the inner panel being positioned on the two side supports and the said support beam, and between the inner edge of the platform and the said support beam; the outer panel having an inner edge dimensioned to rest on the flanged top of the said support beam, an outer edge that is of the same radius as the outer edge of the platform, and two straight sides that are half the length of the side support and the outer panel being secured between the two side supports and the said support beam, and positioned between the inner edge of the platform and the said support beam.

11. A method of construction of an elevated annular platform as claimed in claim 1 wherein each panel is made from a material selected from: concrete, concrete fiber; other rigid fibrous material, and a combination thereof.

12. A method of construction of an elevated annular platform as claimed in claim 7 wherein each panel is made from a material selected from: concrete, concrete fiber; other rigid fibrous material, and a combination thereof.

13. A method of construction of an elevated annular platform as claimed in claim 1 wherein the method further includes the final step of removing the upright edgings.

14. A method of construction of an elevated annular platform as claimed in claim 1 wherein the filler material bonds to the material of the panels irreversibly.

15. A method of construction of an elevated annular platform as claimed in claim 14 wherein said filler material is selected from the group: concrete, natural rubber, synthetic rubber; plastics materials; or a compound comprising a combination of these materials.

16. A method of construction of an elevated annular platform as claimed in claim 1 wherein after the step of constructing the foundation, said method further includes the step of incorporating means to rotate the platform, said motive means being positioned between the foundation and the mould formed of the plurality of bail sections.

17. A method of construction of an elevated annular platform as claimed in claim 7 wherein after the step of constructing the foundation, said method further includes the step of incorporating means to rotate the platform, said motive means being positioned between the foundation and the mould formed of the plurality of bail sections.

18. A method of construction of an elevated annular platform as claimed in claim 16 wherein said flanged metal support beam forms part of the motive means assembly.

19. A method of construction of an elevated annular platform as claimed in claim 1 wherein the step of filling the mould with filler material is carried out over a period of time such that one or more portions of the mould are filled and allowed to set before adjacent sections are filled, the modified step being continued until all the mould is filled and the annulus set and cured.

20. A method of construction of an elevated annular platform as claimed in claim 1 wherein said blanks, sleeves and packing and the corresponding spaces, in the mould and panels thereof, are all positioned on the edges of the straight sides of each bail section.

21. A method of construction of an elevated annular platform as claimed in claim 7 wherein said blanks, sleeves and packing and the corresponding spaces, in the mould and panels thereof, are all positioned on the edges of the straight sides of each bail section.

22. A method of construction of an elevated annular platform as claimed in claim 17 wherein said blanks, sleeves and packing and the corresponding spaces, in the mould and panels thereof, are all positioned on the edges of the straight sides of each bail section.

23. An annular elevated platform constructed by the method of claim 1.

24. The annular elevated platform constructed by the method of claim 23, wherein each side support means includes:
  a section of flat bar which, in length, is less than or equal to the width of the platform, each bar being positioned on one radial side of the bail section;
  a shear connector plate which is positioned in a vertical orientation along the one radial side of the bail section and connected to the respective bar;
  a panel support bar which is positioned along the one radial side below the shear connector plate and, in cross-section, extending either side of the shear connector plate.

25. The annular elevated platform constructed by the method of claim 24, wherein after the step of constructing the foundation, said method further includes the step of incorporating means to rotate the platform, said motive means being positioned between the foundation and the mould formed of the plurality of bail sections; and
  said blanks, sleeves and packing and the corresponding spaces, in the mould and panels thereof, are all positioned on the edges of the straight sides of each bail section.

26. A kit of parts for the construction of an elevated annular platform as claimed in claim 23, said kit including: a plurality of elements for construction of a plurality of bail sections to form a mould for said platform, said elements including the following:
  a plurality of side support means each of which is to be positioned along a radial side of a bail section and secured at the midpoint to the flanged support beam;
  a panel of pre-cast material, each said panel having an inner edge of the same radius as that of the inner edge of the platform, an outer edge that is the same radius as the outer edge of the platform, and two straight sides that are the same length as the length of the side support means; each panel being positioned between the two side supports and the said support beam, and between the inner and outer edges of the platform;
  the upright inner and outer edgings; and
  the curved, flanged metal support beam;
  wherein said elements are crated or packed to maximize the use of available space in a crate or container for shipping to the site of the construction of the platform.

27. A kit of parts for the construction of an elevated annular platform as claimed in claim 26 wherein the elements of iron or steel are weather-sealed prior to packing the said kit of parts, said sealing being selected from: galvanizing, hot dipping, paining, or a combination thereof.

* * * * *